United States Patent
Hood et al.

(10) Patent No.: US 9,656,811 B2
(45) Date of Patent: May 23, 2017

(54) DRAG SLAT CHAIN TENSIONING DEVICE AND STOP

(71) Applicant: Weiler, Inc., Knoxville, IA (US)

(72) Inventors: William Aaron Hood, Reasnor, IA (US); Michael Allen Kooker, Pella, IA (US)

(73) Assignee: Weiler, Inc., Pella, IA (US)

( * ) Notice: Subject to any disclaimer, the term of this patent is extended or adjusted under 35 U.S.C. 154(b) by 8 days.

(21) Appl. No.: 14/882,104

(22) Filed: Oct. 13, 2015

(65) Prior Publication Data

US 2017/0101269 A1   Apr. 13, 2017

(51) Int. Cl.
 *B65G 23/44* (2006.01)
 *B65G 19/10* (2006.01)

(52) U.S. Cl.
 CPC ............ *B65G 23/44* (2013.01); *B65G 19/10* (2013.01)

(58) Field of Classification Search
 CPC .................. B65G 23/44; B65G 19/00–19/306
 USPC .................................................. 198/813–816
 See application file for complete search history.

(56) References Cited

U.S. PATENT DOCUMENTS

| | | | |
|---|---|---|---|
| 3,581,588 A * | 6/1971 | Eftefield ................ | F16H 7/14 474/110 |
| 3,776,326 A | 12/1973 | Davin et al. | |
| 3,826,149 A | 7/1974 | Freese | |
| 3,910,649 A | 10/1975 | Roskaft | |
| 3,946,619 A | 3/1976 | Needles et al. | |
| 3,963,115 A * | 6/1976 | Teske .................... | B65G 43/02 198/718 |
| 3,997,277 A | 12/1976 | Swisher, Jr. et al. | |
| 4,440,097 A * | 4/1984 | Teske .................... | F23J 1/02 110/167 |
| 4,508,213 A * | 4/1985 | Kelley ................... | B65G 23/44 198/813 |
| 4,780,040 A * | 10/1988 | Petersen ................ | H05K 13/0061 198/817 |
| 5,921,378 A | 7/1999 | Bonnet | |
| 6,408,965 B1 | 6/2002 | Grant | |
| 6,695,130 B1 * | 2/2004 | Blaylock ............... | B65G 23/44 198/813 |
| 6,769,836 B2 | 8/2004 | Lloyd | |
| 7,077,601 B2 | 7/2006 | Lloyd | |
| 8,973,742 B2 * | 3/2015 | Tout ...................... | B65G 23/44 198/810.04 |
| 9,033,136 B2 * | 5/2015 | Hesketh ................ | B65G 19/20 198/813 |
| 2002/0074214 A1 * | 6/2002 | Klabisch ............... | B65G 19/28 198/813 |
| 2013/0037170 A1 * | 2/2013 | O'Halloran ........... | B27B 31/006 144/242.1 |

(Continued)

FOREIGN PATENT DOCUMENTS

DE    10148974 A1    4/2003

*Primary Examiner* — Mark A Deuble
(74) *Attorney, Agent, or Firm* — Camille L. Urban; BrownWinick Law Firm (57) ABSTRACT

Adjustment and tensioning of a drag slat chain system is necessary in order to best handle loads while keeping the drag moving and minimizing chances of the chain jumping the sprocket. An automated means of such adjustment is accomplished by providing a known force to tension the chain to a Known "slack" and then automatically setting a mechanical stop to maintain an "ideal" tension range.

3 Claims, 7 Drawing Sheets

(56) References Cited

U.S. PATENT DOCUMENTS

2013/0277178 A1 10/2013 Strieker
2015/0041285 A1* 2/2015 Hesketh ................ B65G 19/20
  198/728

* cited by examiner

DRAG SLAT CHAIN TENSIONING DEVICE AND STOP

FIELD OF INVENTION

The present invention pertains to the paving industry in general and, more particularly, to drag slats employed to move dense material such as asphalt from one location to another.

BACKGROUND

Material transfer vehicles and other machines used to transfer heavy materials often include mechanisms to move the material out of the machine and deliver the material in a desired location. Some may include mechanisms so simple as means to lift one end of a container to allow the material to slide via gravity out the lower end. However, many materials are not readily induced to slide across any surface by mere gravity, or at least not to move in a reasonable amount of time. Further, including on the vehicle a container that may be lifted by one end requires a mechanism with enough power to lift one end of the container; many materials are so dense that the power requisites to lift an end of the container are prohibitively expensive.

Other material transfer mechanisms may include augering means. Materials conducive to auguring typically include fungible small pieces and work best when auguring nearly level but may also be used to move materials upwards. Pneumatic and/or vacuum devices may also be used to move material yet, once again, materials best moved in that way are materials that act like fluid or have fluid-like properties such as grain, sand, and semi-liquids.

Yet other materials may be moved via an elevator mechanism. Some elevator mechanisms include moving platforms, perhaps accompanied by a plurality of shelves or, alternatively, a plurality of buckets. Other elevator mechanisms may include drag slat chains. Drag slat chains include parallel chains associated with each other via spaced apart slats. The slats act to support the material's movement toward the direction of travel as the chains move the slats. The chains are moved using sprockets, wheels, rollers, or other devices that temporarily engage the chain as it is turned around the sprocket or wheel and disengage when the direction of travel of that portion of the chain is reversed. This approach is often used with heavy, chunky material such as hot asphalt.

A problem with prior art means of moving heavy materials using drag slat chains in an elevator type of arrangement is that the chains are prone to wear. The wear is expedited when the chain moves a heavy load without adequate tension on the chain; further, wear occurs if the chains are not evenly tightened or a shock load occurs. The problem of maintaining proper chain tension has been a long-standing one and includes two aspects. The first aspect is the avoidance of too much tension which causes friction and requires excessive power to move the drag slat chain. The second aspect is the avoidance of too little tension which will result in sag which, when tightened, can cause the chain to "jump" resulting in being out of phase with the other chain. Out of phase chains often result in breaking one of the chains.

The chains on a drag slat device are expensive to replace and time consuming to repair. Prior means to address the issues presented by too much or too little tension included the use of hand-turned threaded bolts to adjust the tension on the chain a) by moving the sprocket (or wheel or roller or other driving means) around which the chain moved or b) by moving a structure upon which the sprocket (or wheel or roller) was mounted to achieve that effect. Where such means were employed, hand adjustment of one chain and then the other was likely to cause uneven and inexact tensioning and often those were the results. Alternatively, if such adjustment was done simultaneously, the machine would have to be deactivated for accurate adjustment. For example, the sprockets could be associated so that moving one sprocket also equally moved the other via hand-turned threaded bolts or any other sort of means. Still other means for adjusting could be effected by activation by the operator of a switch or lever; the switch or lever may, in turn, actuate fluid to be pumped into a cylinder or two cylinders which, in turn, caused the sprockets to move. However, whether simultaneous adjustment or alternate side adjustments were used to adjust the chains, or whether the adjustment was by hand or through the use of powered actuators, the operator first had to recognize that the load on the drag slats and the tension on the drag slats needed adjustment and then apply the adjustment.

What was needed was a system for monitoring and adjusting the tension on a drag slat chain to accommodate loads while minimizing wear on the chains. The system also needed to include a hard stop beyond which the chain could not be slackened in order to avoid having a chain jump the sprocket or other driving means. Further, the system would benefit from means to adjust the hard stop relative to the present state of wear or "slop" of the chain, and means to cause the motor to stop or stall to avoid damage.

SUMMARY OF THE INVENTION

The tension on drag slat chains of the present invention is automatically or selectively adjusted and monitored to provide more efficient transfer of heavy materials such as, for example, asphalt. The slat chain life is increased by reducing the negative effects that may occur with uneven tension between drag slat chains or when a chain jumps a tooth of a drive sprocket which may occur with shock loads. Chain life is also increased by increasing the consistency and control of chain tension.

The present invention addresses the problems in the prior art caused by providing a fixed spatial relationship between sprockets or other means such as a wheel that reverses the direction of travel of the chain. In prior art, a chain around each sprocket is moved as the respective sprocket rotates. A variety of factors may result in incorrect tensioning of the chains including wear that causes slack, and sprockets that are not adequately aligned with one another. Where more than one sprocket-and-chain pair is present on a drag slat chain, means to adjust the tension on the chain(s) wound around each said sprocket are essential to preserve chain life. The present invention provides means for retaining sprockets in relative alignment with each other and also for adjustment in chain tension to accommodate for the type of load and the slack or lack thereof in the chain. The present invention provides means of ongoing adjustment of the chain tension in accordance with a predetermined range of desirable tension.

In one embodiment, at least one hydraulic cylinder is associated with means to adjust the position of at least one sprocket (or wheel or roller) around which one or more chains of a drag slat chain is wound. Other means to cause a change in position of the at least one sprocket may be used alternatively such as pneumatic means or mechanical means.

In one embodiment, a hydraulic cylinder is set so that its rod provides a predetermined pressure within a range on the means to adjust the position of the sprocket. This pressure corresponds to a range of desirable tension on the chain known as "Slack". A mechanical stop may be employed to secure the position of the sprocket and to anchor the "ideal" chain tension which should include, generally, as much slack as possible without allowing the chain to jump the sprocket teeth. Periodically the hydraulic cylinder is pressurized to a predetermined pressure range to push its rod outward and against the means to adjust the sprocket's position (means to reposition the driving means); as the sprocket moves, the tension on the chain wound around it increases. The rod is pushed until the hydraulic cylinder is at a pressure within the predetermined range. In a preferred embodiment, the sprocket's new position is secured by a mechanical stop which is provided by a torque and timing assembly that comprises a securing member, and a chain tension range member that includes a slot or other opening which includes an adjustable securement means, together, secures and accommodates the new position of the sprocket. If the slack in the chain is not enough to be out of the "ideal" range, when the pressure is relieved from the cylinder the chain simply reverts back to the previous position relative to the chain tension range member.

Adjusting tension on the drag slat chains may be accomplished via direct association of a hydraulic cylinder (or other source of pressure) with an axle for the sprocket or via an indirect association with the sprocket such as via repositioning of a slider box or a moveable wall of a slider box mechanically associated with the sprocket or sprockets which, in turn, causes relative movement of the sprocket(s) or other driving means and results in adjustment to the tension on the chains of the drag slats. Correct adjustment of the drag slat chains results in extending the life of the drag slat chains.

DETAILED DESCRIPTION OF THE INVENTION

Figure 1:
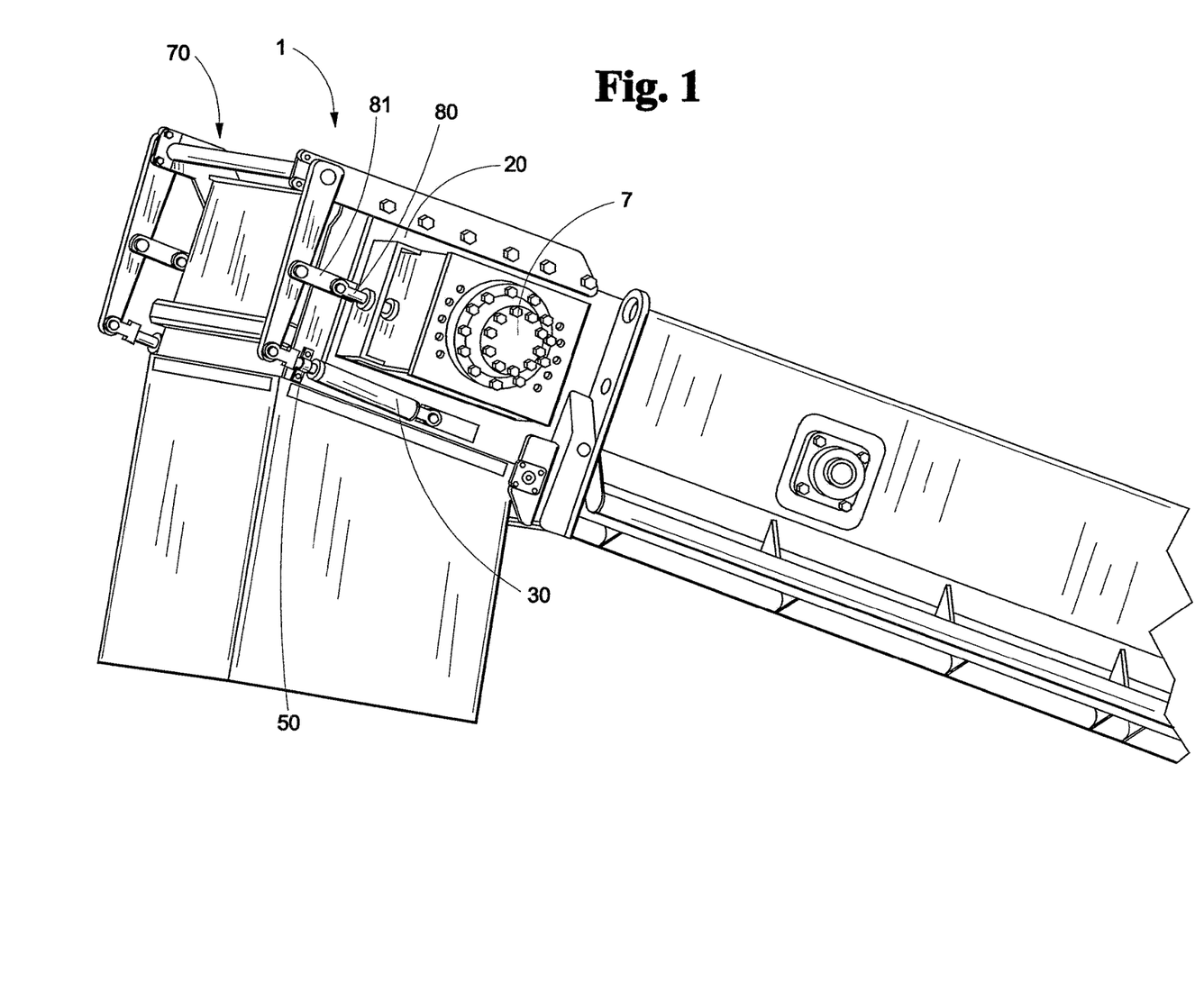
FIG. 1 is a perspective view of the drag slat chain and torque and timing assembly.
Figure 2:
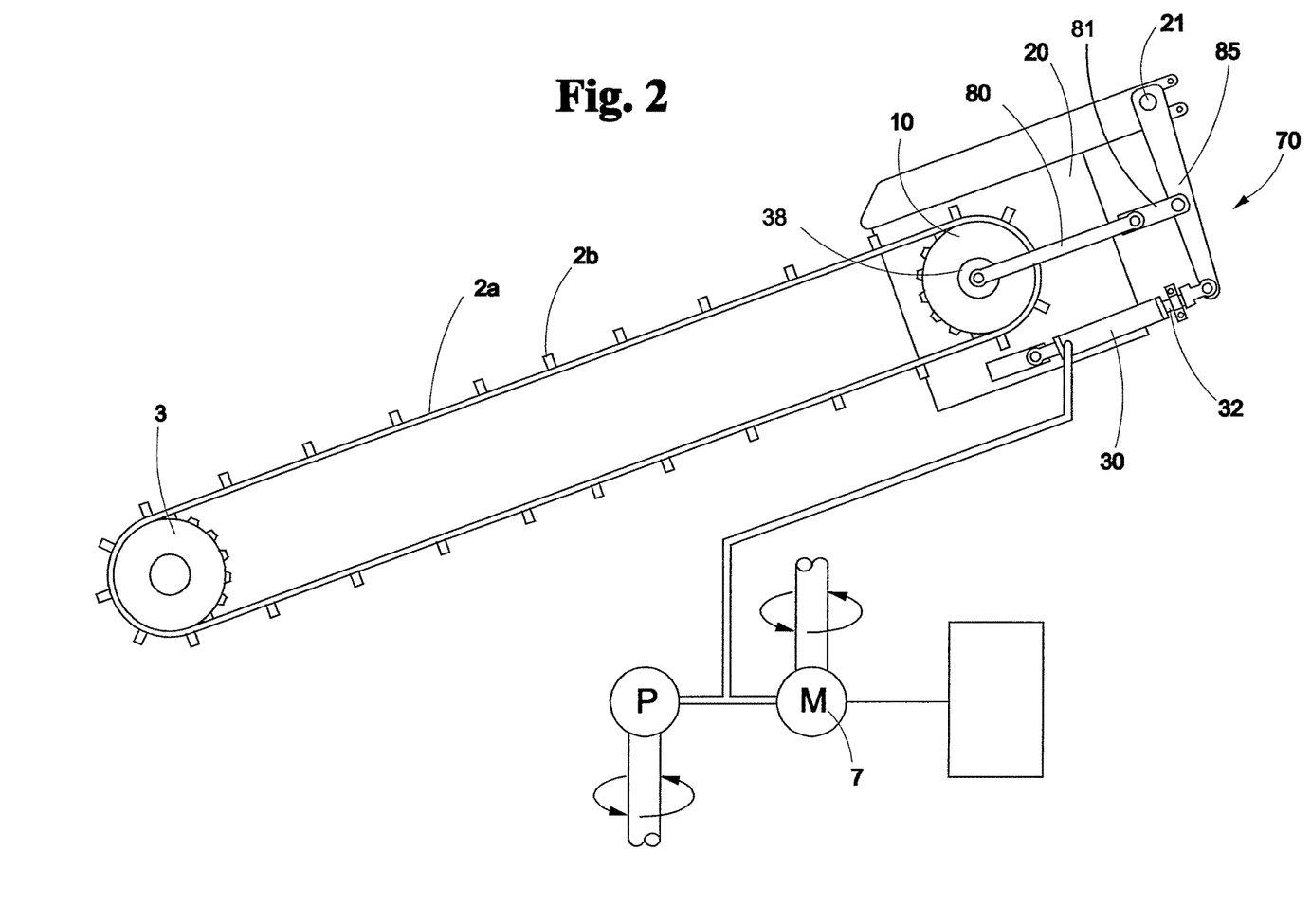
FIG. 2 is a cut away side view of the drag slat chain, torque and timing assembly and external motor.
Figure 3:
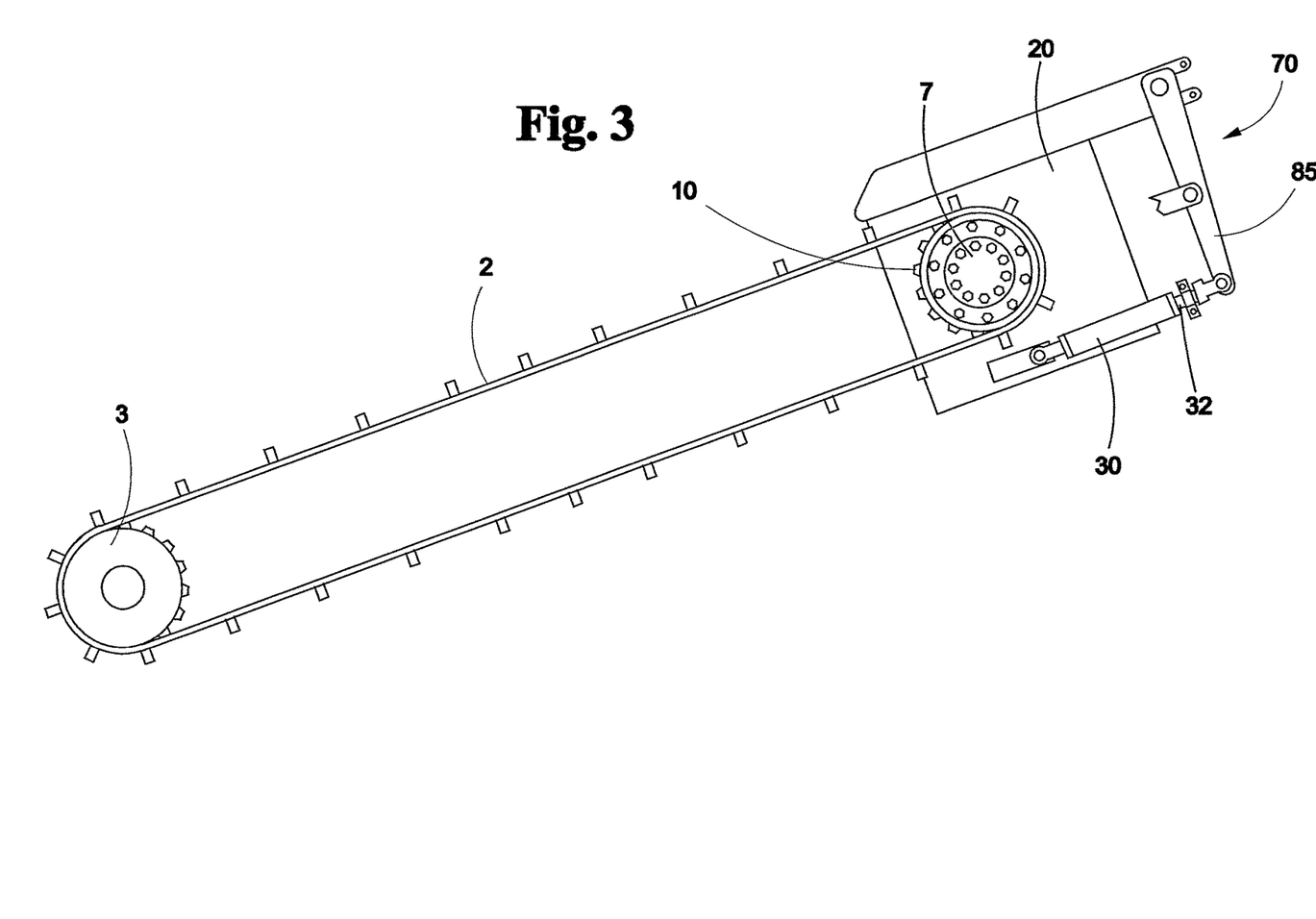
FIG. 3 is a cut away side view of the drag slat chain, torque and timing assembly and an internal motor.
Figure 4:
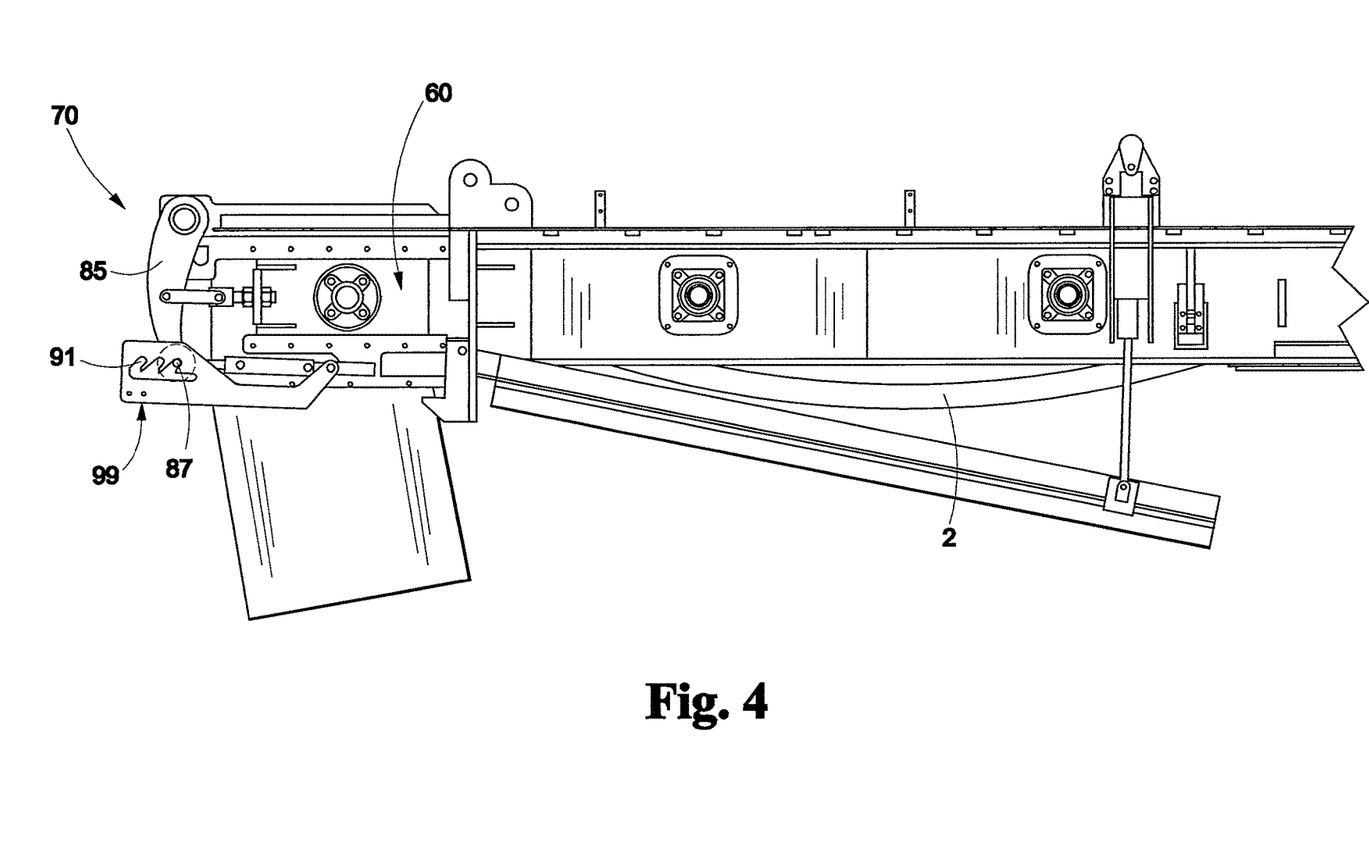
FIG. 4 is a side view showing the drag slat chain at a first tension, the timing and torque assembly.
Figure 5:
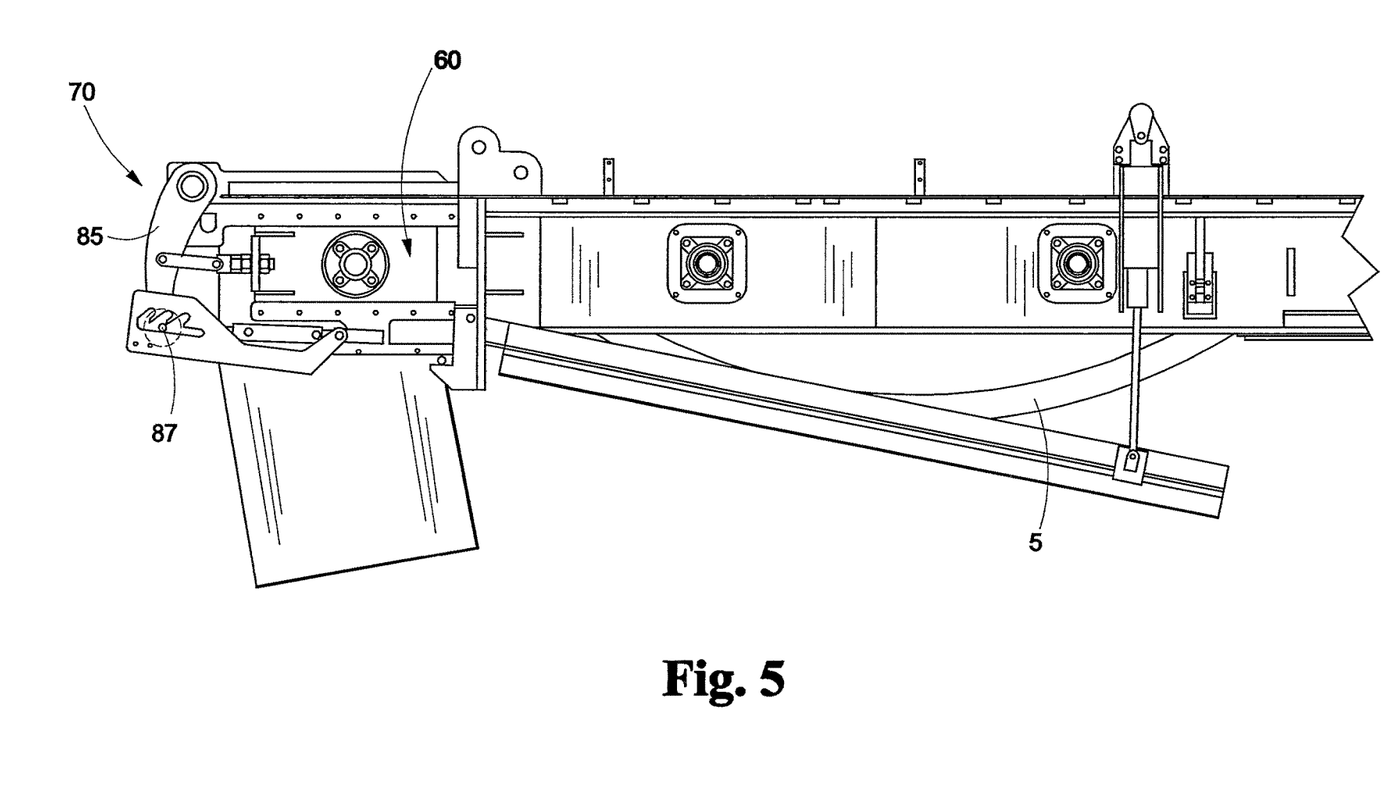
FIG. 5 is a side view showing the drag slat chain at a second tension, the timing and torque assembly.
Figure 6:
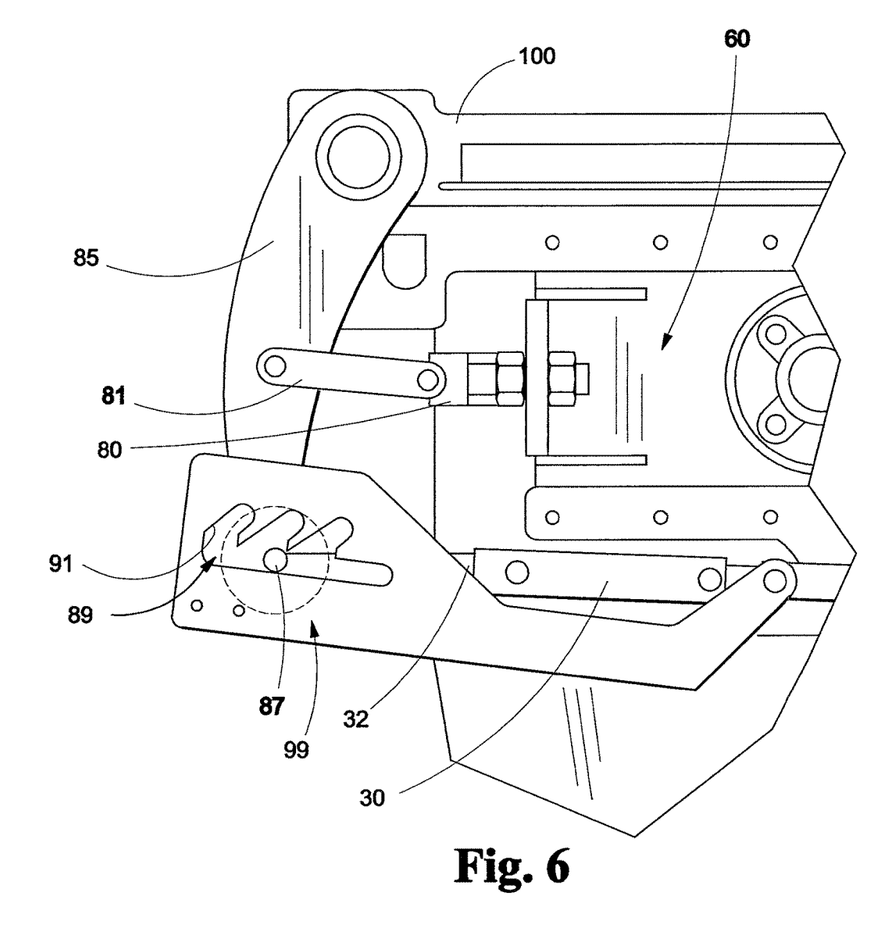
FIG. 6 is a close up side view of a portion of the timing and torque assembly and the chain tension range member.
Figure 7:
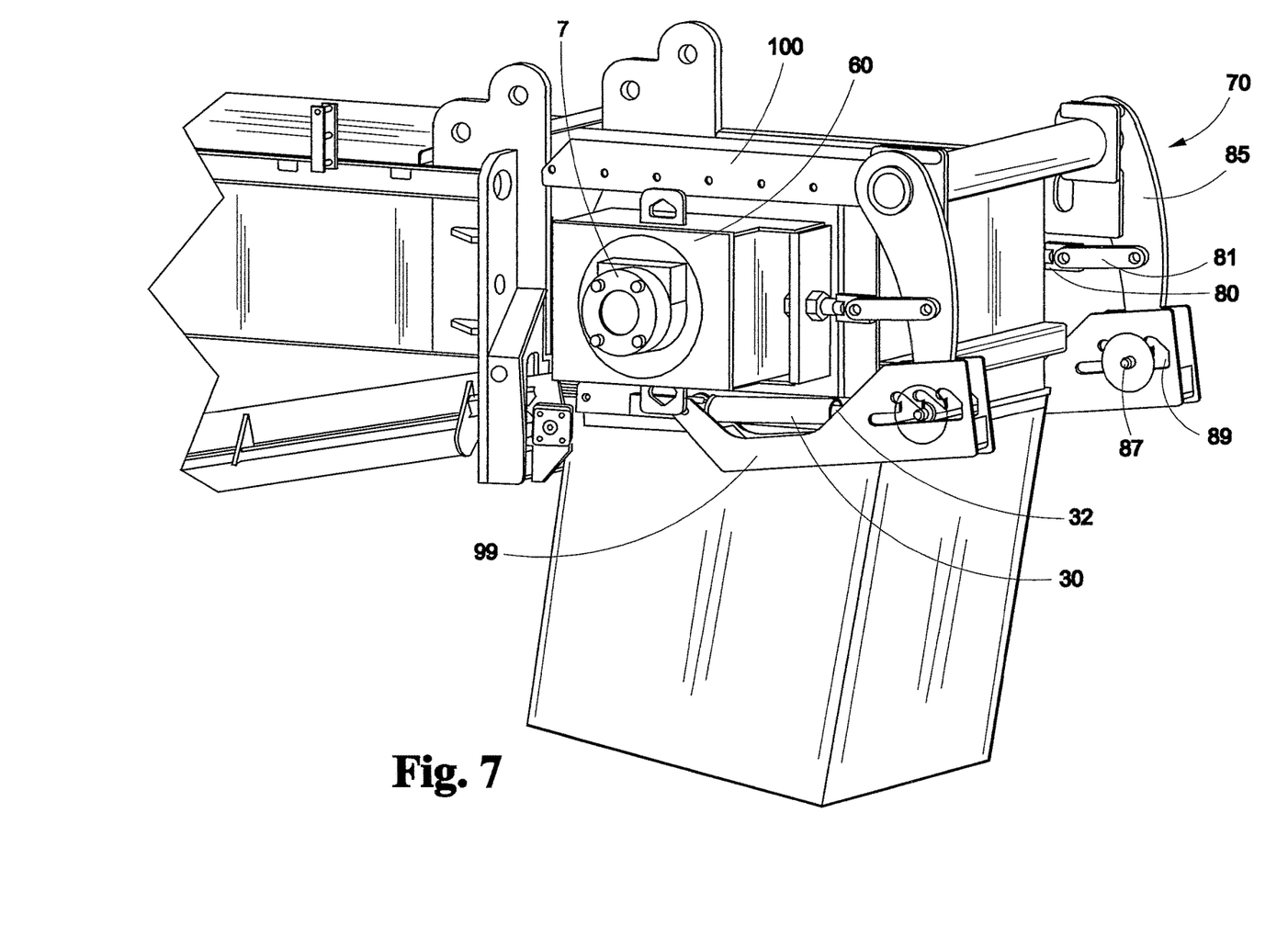
FIG. 7 is a perspective of the torque and timing assembly

The present invention 1 is a system comprising a drag slat chain 2, a timing and torque assembly 70, see FIG. 4 and a motor 7. See FIG. 4. The drag slat chain 2 comprises at least one chain 2a and a plurality of slats 2b, said drag slat chain 2 looped around a sprocket or idler 3 and driving means which may include a sprocket 10. The driving means may be sprockets, wheels, rollers, or any device that reverses the direction of the drag slat chain 2. The invention comprises the motor 7 or is associated with a vehicle having a motor 7 that is driven and in turn drives sprocket(s) 10 that drive chain 2. The sprocket(s) 10 are mechanically associated with a movable member 60 which may comprise an axle, a slider box or a plate 60. See FIGS. 4-7. A torque and timing assembly 70 (see FIGS. 4 and 6) is associated with at least one pressure source 30 which may be a hydraulic cylinder 30 said pressure source 30 associated with an actuating device or member 32 which may be a rod 32. The torque and timing assembly 70 further comprises a first timing adjustment member 80 and a second timing adjustment member 81 for purposes to be discussed, a lever 85, a securing member 87, and a chain tension range member 99 comprising adjustable securement means 89.

In one embodiment, the pressure source 30 is mechanically connected to motor drive box 20 and its corresponding slider box or slider plate 60 via the actuating device 32 and its association with the constant torque and timing assembly 70 comprising timing adjustment members 80 and 81.

Actuating device 32 may effect movement or repositioning of driving means which may comprise sprocket(s) 10 relative to sprocket(s) 3. In an embodiment wherein each of two chains 2a are rotated around separate sprockets 10, the actuating device 32 effects movement of both sprockets 10 relative to the distance between sprockets 10 and sprocket(s) 3. In this embodiment, the actuating device 32 is mechanically associated with the securing member 87 on the lever 85. The lever 85 is rotationally associated with a frame 100 and with first timing member 80 which is, in turn, associated with second timing member 81 which is mechanically coupled to the slider plate or slider box 60. Upon rotation of the lever 85 caused by the actuating device 32, the first and second timing members 80 and 81 pull the slider plate (or slider box) 60 and the sprocket(s) 10 with which it is associated outward causing the distance between sprockets 3 and sprockets 10 to be evenly adjusted and secured, thereby controlling tension in the chains 2a. In another embodiment a single timing member 80 is employed to similarly move the sprockets 10.

In an embodiment timing members 80 and 81 are pivotally associated with each other to allow translation of the rotation of lever 85 to a force on the first timing member 80 to cause the slider plate 60 to move and adjust the position of the sprocket(s) 10 for slack management. Simultaneously, securing member 87 is also moved with the lever 85. The chain tension range member 99 may comprise adjustable securement means 89 which, in one embodiment, comprises a sliding slot 90 and a plurality of securing slots 91. When the securing member 87 is moved by the lever 85, it will slide into one of said plurality of securing slots 91 causing the sprocket(s) 10 to be secured in position after pressure is relieved from 32.

Alternatively, the slider plate 60 is replaced with a slider box 20 and said sprockets 10 may be associated with and positioned within the slider box 20 along with a connecting axle or other means known in the art. The slider box 20 is associated with actuating member(s) 32. In this embodiment, cylinder 30a, 30b pushes actuating member(s) 32 which, in turn moves the sliderbox 20 which is associated with the sprockets 10 and, consequently, effects movement of sprockets 10 and tension on drag slat chain 2. The example of the slider box 20 or the front wall of the slider box or slider plate 60 is not meant to be limiting. Anything with which one or more of the sprockets 10 can be movably associated may equally operate to be re-positioned by the pressure-associated movement of the actuating member(s) 32.

In one embodiment, the pressure in cylinders 30a, 30b are provided as a constant known force. The pressure in 30a and 30b, in turn, applies a known force to the actuating member (s)/device 32. If the chain 2 is too slack, this force will cause the actuating members 32 to extend which, in turn, causes the torque and timing assembly 70 to move the slider box 20 which, in turn, moves the sprockets 10 and tightens the chain 2 as previously described. In an alternative embodiment, the actuating member(s) 32 are associated directly with the sprockets 10 and cause movement of the sprockets 10 relative to the pressure in the cylinder(s) 30. A single cylinder 30 may be employed, or two or more than two may be employed so long as the cylinder or cylinders 30 are hydraulically associated with the motor 7 and the pressure in the cylinders 30 is applied at a constant and known pressure. In operation, the system periodically increases the pressure in the cylinders 30 to a set level thereby taking up slack that has accumulated in the chain 2. Upon increasing the pressure in the cylinder 30, the hydraulic rod or other actuator 32 will be extended. The rod or other actuator 32 is associated with the timing and torque assembly 70. The timing and torque assembly 70 comprises a lever 85 associated with second timing member 81 which is mechanically associated with first timing member 80. The timing members 80, 81 translate movement of lever 85 to cause movement of sprocket(s) 10 until the predetermined constant pressure in the hydraulics is once again achieved. Which in turn tensions chain 2 to the predetermined tension which is achieved by the relative position of box 20 and slider plate 60.

In one embodiment, the chain tension range member 99 provides adjustable securement means 89 to secure the securing member 87 in accordance with the movement of lever 85 and the associated sprockets 10 when the ideal chain slack is achieved. Said securement means 89 are preferably designed to allow a securing member 87 to be secured at any of several positions corresponding to different adjustments for managing chain slack via sprocket positioning. The securing member's 87 position could automatically be set when the pressure is applied to cylinder 30 to achieve tension within the ideal range, then said pressure is released allowing the chain to relax to preset stop position providing ideal chain tension. If, instead, the chain 2 does not yet have a level of slack that allows the securing member 87 to be secured by the securement means 89, then upon reduction of pressure the actuator 32 will simply retract and the securing member 87 and the chain 2 will regain their previous positions until the next periodic increase in pressure is applied to the cylinder 30. This repeats until the chain 2 has enough slack that the securing member 87 is moved far enough to be secured by the next tightest position in the securement means 89.

It should be appreciated that the invention has been described in terms that enable one of ordinary skill in the art to make and practice the present invention. Further, the terms used herein are intended to encompass alternatives that one of skill in the art would understand. For example, the known and even tension could be achieved in many ways but setting the range of position automatically and evenly is the key.

The present invention has been described using various embodiments of the invention. However, it should be understood that the description is for purposes of illustration only and that various modifications and changes may be made to the structure, design, application and methodology without departing from the nature of the invention which is defined in the appended claims. Because these variations are possible within the scope of the invention, the details provided herein are to be interpreted as illustrative and not in a limiting sense. Further, plural and singular forms should not be interpreted as limited in that way.

What we claim is:

1. A system for maintaining tension of a drag slat chain within a predetermined tension range, said system comprising a driving means for rotating said drag slat chain and an actuating member associated with a torque and timing assembly for translating movement of the actuating member to reposition said driving means, said actuating member mechanically associated with the driving means, the system further comprising a tension range member, a lever, and at least one hydraulic cylinder for moving said actuating member, said lever comprising a securing member and mechanically coupled to said driving means, said tension range member comprising adjustable securement means wherein activation of said at least one hydraulic cylinder causes a movement of the actuating member and the lever a distance relative to the slack in the drag slat chain.

2. The system of claim 1, said movement causing said securing member to move relative to the adjustable securement means and if aligned therewith become secured therein.

3. The system of claim 2 wherein said adjustable securement means comprises a plurality of slots in which said securing member may be secured.

* * * * *

UNITED STATES PATENT AND TRADEMARK OFFICE
CERTIFICATE OF CORRECTION

Page 1 of 1

PATENT NO. : 9,656,811 B2
APPLICATION NO. : 14/882104
DATED : May 23, 2017
INVENTOR(S) : William Aaron Hood and Michael Allen Kooker It is certified that error appears in the above-identified patent and that said Letters Patent is hereby corrected as shown below:

On the Title Page

Item (73), the name of the Assignee is "Weiler, Inc." not "Weller, Inc.".

Signed and Sealed this
Tenth Day of October, 2017

Joseph Matal
*Performing the Functions and Duties of the*
*Under Secretary of Commerce for Intellectual Property and*
*Director of the United States Patent and Trademark Office*